United States Patent
Nasir et al.

(10) Patent No.: US 9,347,367 B2
(45) Date of Patent: May 24, 2016

(54) SYSTEM HAVING DUAL-VOLUTE AXIAL TURBINE TURBOCHARGER

(71) Applicant: Electro-Motive Diesel, Inc., Lagrange, IL (US)

(72) Inventors: Shakeel Nasir, Willowbrook, IL (US); Joshua David Schueler, New Lenox, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 157 days.

(21) Appl. No.: 13/938,682

(22) Filed: Jul. 10, 2013

(65) Prior Publication Data

US 2015/0013332 A1    Jan. 15, 2015

(51) Int. Cl.
*F02B 37/02* (2006.01)
*F02B 37/00* (2006.01)
*F02B 37/007* (2006.01)
*F02B 37/013* (2006.01)
(Continued)

(52) U.S. Cl.
CPC .............. *F02B 37/025* (2013.01); *F01D 9/026* (2013.01); *F01D 9/041* (2013.01); *F02B 37/001* (2013.01); *F02B 37/004* (2013.01); *F02B 37/007* (2013.01); *F02B 37/013* (2013.01); *F05D 2220/40* (2013.01)

(58) Field of Classification Search
CPC ....... F01D 9/026; F01D 9/041; F02B 37/025; F02M 25/0704
USPC ............................................ 415/4.3, 4.5, 77
See application file for complete search history.

(56) References Cited

U.S. PATENT DOCUMENTS

| | | |
|---|---|---|
| 2,435,042 A | 1/1948 | Johansson |
| 2,526,281 A | 10/1950 | Ryan et al. |

(Continued)

FOREIGN PATENT DOCUMENTS

| | | |
|---|---|---|
| DE | 197 17 846 | 11/1998 |
| EP | 1 072 765 | 6/2010 |

(Continued)

OTHER PUBLICATIONS

Dr. Johannes Kech et al., "Exhaust Gas Recirculation: Internal Engine Technology for Reducing Nitrogen Oxide Emissions", Engine Technology, MTU Friedrichshafen GmbH, www.mtu-online.com (Aug. 2011).

(Continued)

*Primary Examiner* — Mary A Davis
(74) *Attorney, Agent, or Firm* — Finnegan, Henderson, Farabow, Garrett & Dunner, LLP (57) ABSTRACT

A turbocharger is disclosed for use with an engine system. The turbocharger may have a housing at least partially defining a compressor shroud and a turbine shroud. The turbine shroud may form a first volute and a second volute, each having an inlet configured to receive exhaust from an exhaust manifold of the engine in a tangential direction, and an axial channel disposed downstream of the inlet. The turbocharger may also have a turbine wheel disposed within the turbine shroud and configured to receive exhaust from the axial channels of the first and second volutes, a compressor wheel disposed within the compressor shroud, and a shaft connecting the turbine wheel to the compressor wheel. The turbocharger may further have a nozzle ring in fluid communication with the axial channels of the first and second volutes at a location upstream of the turbine wheel.

13 Claims, 4 Drawing Sheets

(51) Int. Cl.
  *F02M 25/07* (2006.01)
  *F01D 9/02* (2006.01)
  *F01D 9/04* (2006.01)

(56) References Cited

U.S. PATENT DOCUMENTS

| | | | |
|---|---|---|---|
| 2,631,427 A * | 3/1953 | Rainbow | 60/792 |
| 2,730,861 A | 1/1956 | Buchi | |
| 3,188,051 A * | 6/1965 | Kanik | 415/209.4 |
| 3,257,797 A | 6/1966 | Lieberherr | |
| 3,383,092 A | 5/1968 | Cazier | |
| 4,100,742 A | 7/1978 | Harp, Jr. | |
| 5,109,674 A | 5/1992 | Sudmanns | |
| 5,215,436 A | 6/1993 | Puzyrewski | |
| 5,517,976 A | 5/1996 | Bächle et al. | |
| 5,671,600 A | 9/1997 | Pischinger et al. | |
| 5,803,719 A | 9/1998 | Ramsden et al. | |
| 5,960,625 A * | 10/1999 | Zdvorak, Sr. | 60/39.34 |
| 6,082,100 A | 7/2000 | Boegner et al. | |
| 6,446,770 B2 * | 9/2002 | Qian et al. | 188/218 XL |
| 6,945,235 B1 | 9/2005 | Bertilsson et al. | |
| 7,908,860 B2 | 3/2011 | Trombetta et al. | |
| 7,941,999 B2 | 5/2011 | Kasper et al. | |
| 7,984,615 B2 | 7/2011 | Woodcock et al. | |
| 8,192,141 B1 * | 6/2012 | Dale | 415/79 |
| 8,234,864 B2 | 8/2012 | Easley, Jr. et al. | |
| 8,281,588 B2 | 10/2012 | Garrett et al. | |
| 8,931,256 B2 * | 1/2015 | Moravec et al. | 60/285 |
| 8,935,917 B2 * | 1/2015 | Hayman et al. | 60/323 |
| 2004/0194463 A1 | 10/2004 | Yanagisawa et al. | |
| 2007/0039314 A1 | 2/2007 | Mizuguchi | |
| 2007/0201974 A1 * | 8/2007 | Dev | 415/77 |
| 2008/0060624 A1 | 3/2008 | Grandas | |
| 2008/0295516 A1 * | 12/2008 | Teshima et al. | 60/624 |
| 2011/0203255 A1 * | 8/2011 | Conete | 60/226.1 |
| 2011/0252790 A1 | 10/2011 | Lotterman et al. | |
| 2011/0252792 A1 | 10/2011 | Kares et al. | |
| 2011/0253113 A1 | 10/2011 | Roth et al. | |
| 2011/0296828 A1 | 12/2011 | An et al. | |
| 2011/0302917 A1 * | 12/2011 | Styles et al. | 60/602 |
| 2012/0078492 A1 | 3/2012 | Freund et al. | |
| 2012/0124997 A1 * | 5/2012 | Elsasser et al. | 60/615 |
| 2014/0208741 A1 * | 7/2014 | Svihla et al. | 60/605.1 |
| 2014/0209073 A1 * | 7/2014 | Johnson | 123/568.12 |
| 2014/0219836 A1 * | 8/2014 | Houst et al. | 415/220 |
| 2014/0223903 A1 * | 8/2014 | Keating | 60/605.2 |
| 2014/0223904 A1 * | 8/2014 | Wood et al. | 60/612 |
| 2014/0260193 A1 * | 9/2014 | Moravec et al. | 60/274 |
| 2014/0298799 A1 * | 10/2014 | Wu et al. | 60/602 |
| 2014/0348647 A1 * | 11/2014 | Stang et al. | 415/207 |

FOREIGN PATENT DOCUMENTS

| | | |
|---|---|---|
| GB | 2 031 069 | 4/1980 |
| GB | 2 093 909 | 9/1982 |
| JP | 60-69213 | 4/1985 |
| JP | 61-210223 | 9/1986 |
| JP | 2007/23920 | 2/2007 |
| WO | WO 2010/116064 | 10/2010 |
| WO | WO 2012/069376 | 5/2012 |

OTHER PUBLICATIONS

U.S. Appl. No. 13/756,123 of Keith A. Moravec et al., entitled "Engine System with Passive Regeneration of a Filter in EGR Loop" filed Jan. 31, 2013.

U.S. Appl. No. 61/849,829 of Keith A. Moravec et al., entitled "Engine System for Increasing Available Turbocharger Energy" filed Jan. 31, 2013.

U.S. Appl. No. 13/755,687 of Gary R. Svihla et al., entitled "Turbocharger with Axial Turbine Stage" filed Jan. 31, 2013.

U.S. Appl. No. 13/756,132 of Steven Dallas Johnson, entitled "Exhaust System Having Parallel EGR Coolers" filed Jan. 31, 2013.

* cited by examiner

SYSTEM HAVING DUAL-VOLUTE AXIAL TURBINE TURBOCHARGER

TECHNICAL FIELD

The present disclosure is directed to a system and, more particularly, to an engine system having a dual-volute turbocharger with an axial turbine stage.

BACKGROUND

Engines are supplied with a mixture of air and fuel for combustion within the engine's cylinders that generates a mechanical power output. In order to maximize the power output generated by this combustion process, the engine is often equipped with a turbocharged air induction system. A turbocharged air induction system increases engine power by forcing more air into the cylinders than would otherwise be possible. This increased amount of air allows for enhanced fueling that further increases the power output generated by the engine.

In some multi-cylinder engines, exhaust pressure pulses generated by the different cylinders can negatively interact with each other and reduce performance of the associated turbocharger. In particular, when different cylinders of an engine fire out of phase with each other, high-pressure and high-temperature pulses of exhaust discharged from the cylinders can attenuate each other within a common manifold that feeds the turbocharger. When the exhaust pulses are attenuated, the turbocharger receives an exhaust flow with lower average pressures and temperatures. These lower pressures and temperatures impart less energy to the turbocharger.

Separate exhaust manifolds can be used together with a dual-volute turbocharger in some applications to help preserve exhaust pulse energy. The separate exhaust manifolds direct exhaust pulses from co-firing cylinders to separate volutes within the turbocharger. Doing so inhibits attenuation of the exhaust pulses, resulting in exhaust passing through the turbocharger at higher average pressures and temperatures. The higher pressures and temperatures impart more energy to the turbocharger.

An exemplary engine system having separate exhaust manifolds and a dual-volute turbocharger is disclosed in U.S. Pat. No. 3,383,092 that issued to Cazier on May 14, 1968 ("the '092 patent"). Specifically, the '092 patent discloses a six-cylinder engine having two separate exhaust manifolds connected between two groupings of co-firing cylinders and two separate volutes of a vaneless axial-flow turbocharger.

Although the system in the '092 patent may have improved performance due to conservation of exhaust pulse energy, it may still be less than optimal. Specifically, because the engine system of the '092 patent provides only single-stage turbocharging, it may be applicable to only low-boost applications. In addition, the axial flow turbocharger of the '092 patent may have low efficiency in particular applications where flow exiting the two volutes and entering corresponding vaneless passages of the turbocharger is poorly guided due to flow misalignment (high incidence) with blades of the turbine. Further, the engine system of the '092 patent may have poor exhaust emissions in diesel engine applications.

The disclosed engine system is directed to overcoming one or more of the problems set forth above and/or other problems of the prior art.

SUMMARY

In one aspect, the present disclosure is directed toward a nozzle ring for a turbocharger. The nozzle ring may include an inner annular band, an outer annular band, and an intermediate annular band located radially between the inner and outer annular bands. The nozzle ring may also include a first plurality of vanes extending between the inner and intermediate annular bands, and a second plurality of vanes extending between the intermediate and outer annular bands.

In another aspect, the present disclosure is directed towards a turbocharger for an engine system. The turbocharger may include a housing at least partially defining a compressor shroud and a turbine shroud. The turbine shroud may form a first volute and a second volute, each having an inlet configured to receive exhaust from an exhaust manifold of the engine in a tangential direction, and an axial channel disposed downstream of the inlet. The turbocharger may also include a turbine wheel disposed within the turbine shroud and configured to receive exhaust from the axial channels of the first and second volutes, a compressor wheel disposed within the compressor shroud, and a shaft connecting the turbine wheel to the compressor wheel. The turbocharger may further include a nozzle ring in fluid communication with the axial channels of the first and second volutes at a location upstream of the turbine wheel.

In another aspect, the present disclosure is directed to an engine system. The engine system may include an engine block at least partially defining a plurality of cylinders, and an axial flow turbocharger having first and second volutes. The engine system may also include a first exhaust manifold associated with a first grouping of the plurality of cylinders, and an exhaust gas recirculation passage extending from the first exhaust manifold to all of the plurality of cylinders. The engine system may further include a second exhaust manifold extending from a second grouping of the plurality of cylinders to the first volute of the axial flow turbocharger, and a third exhaust manifold extending from a third grouping of the plurality of cylinders to the second volute of the axial flow turbocharger.

DETAILED DESCRIPTION

Figure 1:
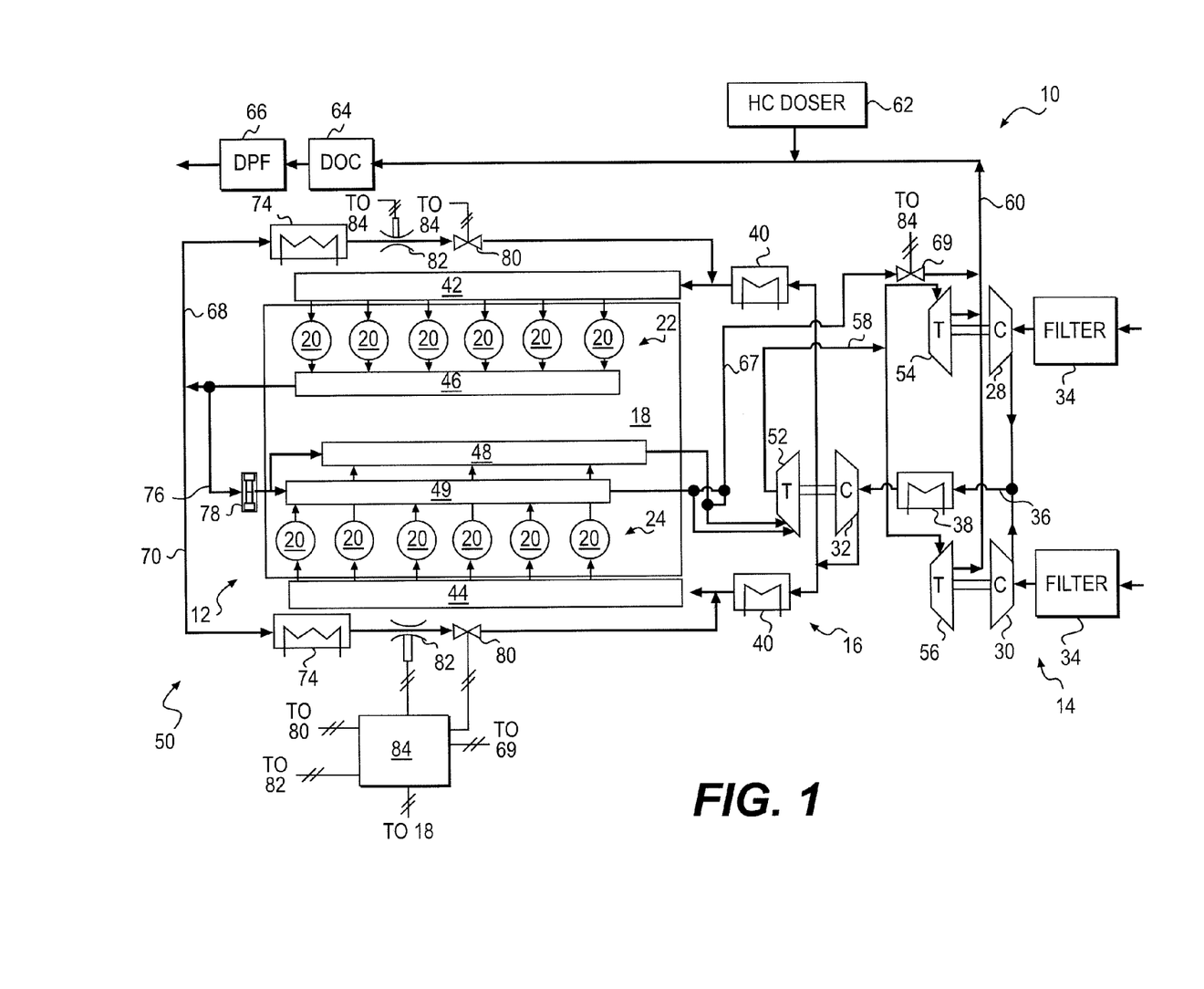
FIG. 1 is a schematic illustration of an exemplary disclosed engine system.

FIG. 1 illustrates an engine system 10 having an engine 12, an air induction system 14, and an exhaust system 16. For the purposes of this disclosure, engine 12 is depicted and described as a four-stroke diesel engine. One skilled in the art will recognize, however, that engine 12 may be any other type of combustion engine such as, for example, a two- or four-stroke gasoline or gaseous fuel-powered engine. Air induction system 14 may be configured to direct air or a mixture of air and fuel into engine 12 for combustion. Exhaust system 16 may be configured to direct combustion exhaust from engine 12 to the atmosphere.

Engine 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber. In the illustrated embodiment, engine 12 includes twelve cylinders 20 arranged in a V-configuration (i.e., a configuration having first and second banks 22, 24 or rows of cylinders 20). However, it is contemplated that engine 12 may include a greater or lesser number of cylinders 20 and that cylinders 20 may be arranged in an inline configuration, in an opposing-piston configuration, or in another configuration, if desired.

Air induction system 14 may include, among other things, at least one compressor and at least one cooler located to chill air compressed by the compressor before it enters the combustion chambers of engine 12. Each compressor may embody a fixed-geometry compressor, a variable-geometry compressor, or any other type of compressor configured to receive air and compress the air to a desired pressure level. In the disclosed exemplary embodiment, air induction system 14 has three compressors, including first and second low-pressure compressors 28, 30 disposed in parallel with each other, and a high-pressure compressor 32 disposed downstream of first and second low-pressure compressors 28, 30. First and second low-pressure compressors 28, 30 may draw air through a corresponding filter 34, compress the air to a first pressure level, and direct the pressurized air to high-pressure compressor 32 via a passage 36. High-pressure compressor 32 may receive the pressurized air from low-pressure compressors 28, 30 and increase the pressure thereof to a higher level. A common first cooler 38 may be located in fluid communication with passage 36 to chill the air pressurized by both first and second low-pressure compressors 28, 30 before it is received by high-pressure compressor 32. Additional coolers 40 may be disposed downstream of high-pressure compressor 32 (e.g., one cooler 40 between high-pressure compressor 32 and each of a first intake manifold 42 and a second intake manifold 44) to further chill the air before it enters the combustion chambers of engine 12. First intake manifold 42 may be associated with first bank 22 of cylinders 20, while second intake manifold 44 may be associated with second bank 24.

Exhaust system 16 may include, among other things, at least one turbine driven by the exhaust from engine 12 to rotate the compressors of air induction system 14. Each turbine may embody a fixed geometry turbine that is configured to receive exhaust and convert potential energy in the exhaust to a mechanical rotation. In the disclosed exemplary embodiment, exhaust system 16 has three turbines, including a high-pressure axial-flow turbine 52, and first and second low-pressure axial-flow turbines 54, 56 disposed in parallel with each other at locations downstream of turbine 52. Exhaust system 16 may also include a first exhaust manifold 46, a second exhaust manifold 48, and a third exhaust manifold 49. First exhaust manifold 46 may be in communication with first bank 22 of cylinders 20, while second and third exhaust manifolds 48, 49 may be in communication with different groupings of cylinders 20 of second bank 24 (e.g., with different groupings of co-firing cylinders 20). Turbine 52 may receive two separate flows of exhaust from only second bank 24 of cylinders 20 via second and third exhaust manifolds 48,49, remove a portion of the potential energy contained therein, and then distribute the exhaust as a mixed flow to turbines 54, 56 by way of a passage 58. After exiting turbines 54, 56, the exhaust may be discharged to the atmosphere via a common passage 60. One or more exhaust treatment devices, for example a hydrocarbon doser 62, a diesel oxidation catalyst (DOC) 64, a diesel particulate filter (DPF) 66, and/or any other treatment device known in the art may be disposed within passage 60, as desired.

In some embodiments, a bypass passage 67 may be provided to selectively allow exhaust from any one or both of first and second exhaust manifolds 48, 49 to bypass the turbines of exhaust system 16 and flow directly into passage 60. A control valve 69 may be disposed within bypass passage 67 to regulate the rate of exhaust flow through bypass passage 67. By regulating this bypassing flow of exhaust, operation of turbines 52-56 may be more tightly controlled.

Exhaust system 16 may also include an exhaust gas recirculation (EGR) circuit 50 configured to selectively divert exhaust into air induction system 14 from a location upstream of turbines 52-56. In particular, EGR circuit 50 may be fluidly connected at a first end with only first exhaust manifold 46 and at an opposing second end with air induction system 14. In the disclosed exemplary embodiment, EGR circuit 50 includes two parallel passages 68, 70 that extend from an end of first exhaust manifold 46 along opposing sides of engine 12 to separately connect to first and second intake manifolds 42, 44 at locations within air induction system 14/ that are downstream of compressor 32 (and downstream of coolers 40). Separate and substantially identical exhaust coolers 74 may be located within each of passages 68, 70 to chill exhaust passing therethrough. The recirculation of relatively cooler exhaust may help to lower an overall temperature of the associated combustion process, thereby lowering a production of NOx and/or other regulated exhaust constituents.

Coolers 74 may each be any type of heat exchanger known in the art that is configured to cool exhaust flowing through EGR circuit 50. For example, coolers 74 may each be an air-to-liquid type of heat exchanger that receives coolant from and returns coolant to engine 12 (e.g., to engine block 18). The coolant may be passed through spaced apart channels within each cooler 74 and used to absorb heat from exhaust passing through adjacent channels. It should be noted that one or both of coolers 74 may alternatively be another type of heat exchanger, if desired, such as an air-to-air heat exchanger.

In some embodiments, a balancing passage 76 may be provided to selectively allow exhaust from first exhaust manifold 46 to flow into second and/or third exhaust manifolds 48, 49 and join the exhaust passing through turbines 52-56. A balancing valve 78 may be disposed within balancing passage 76 to help regulate a pressure within first exhaust manifold 46 and EGR circuit 50. Balancing valve 78 may be a fixed restrictive orifice, a movable pressure-regulated valve (e.g., a spring-biased check valve), or another type of valve known in the art. By regulating the flow of exhaust through bypass passage 76, the pressure of exhaust gas recirculated within engine 12 may be more tightly controlled.

Additional elements may be associated with engine system 10 for use in controlling exhaust gas recirculation. Specifically, exhaust system 16 may include a recirculation control valve 80 located within each of passages 68, 70, at least one flow measuring device 82 associated with one or both of passages 68, and 70 (or alternatively associated with first exhaust manifold 46), and a controller 84 in communication with recirculation control valves 80 and flow measuring device(s) 82. Controller 84 may be configured to regulate operation of recirculation control valves 80 based on input from flow measuring device(s) 82 and/or other input associated with operation of engine.

Recirculation control valve 80 may be any type of valve known in the art such as, for example, a butterfly valve, a diaphragm valve, a gate valve, a ball valve, a poppet valve, or a globe valve. Each recirculation control valve 80 may be solenoid-actuated, hydraulically-actuated, pneumatically-actuated or actuated in any other manner by controller 84 to selectively restrict and/or completely block the flow of exhaust through fluid passageways 68, 70.

Each measuring device 82, in the disclosed exemplary embodiment, includes one or more sensing elements (e.g., two pressure sensors or a single differential pressure sensor) mounted within a venturi. Signals generated by the sensing element(s) may be used as an indication of a flow rate of exhaust through EGR circuit 50. Although shown as being located within each of passages 68, 70, it is contemplated that only one measuring device 82 may alternatively be included and located within only one of fluid passages 68, 70 or in first exhaust manifold 46, if desired. It is also contemplated that a different type of measuring device may be included, if desired.

Figure 2:
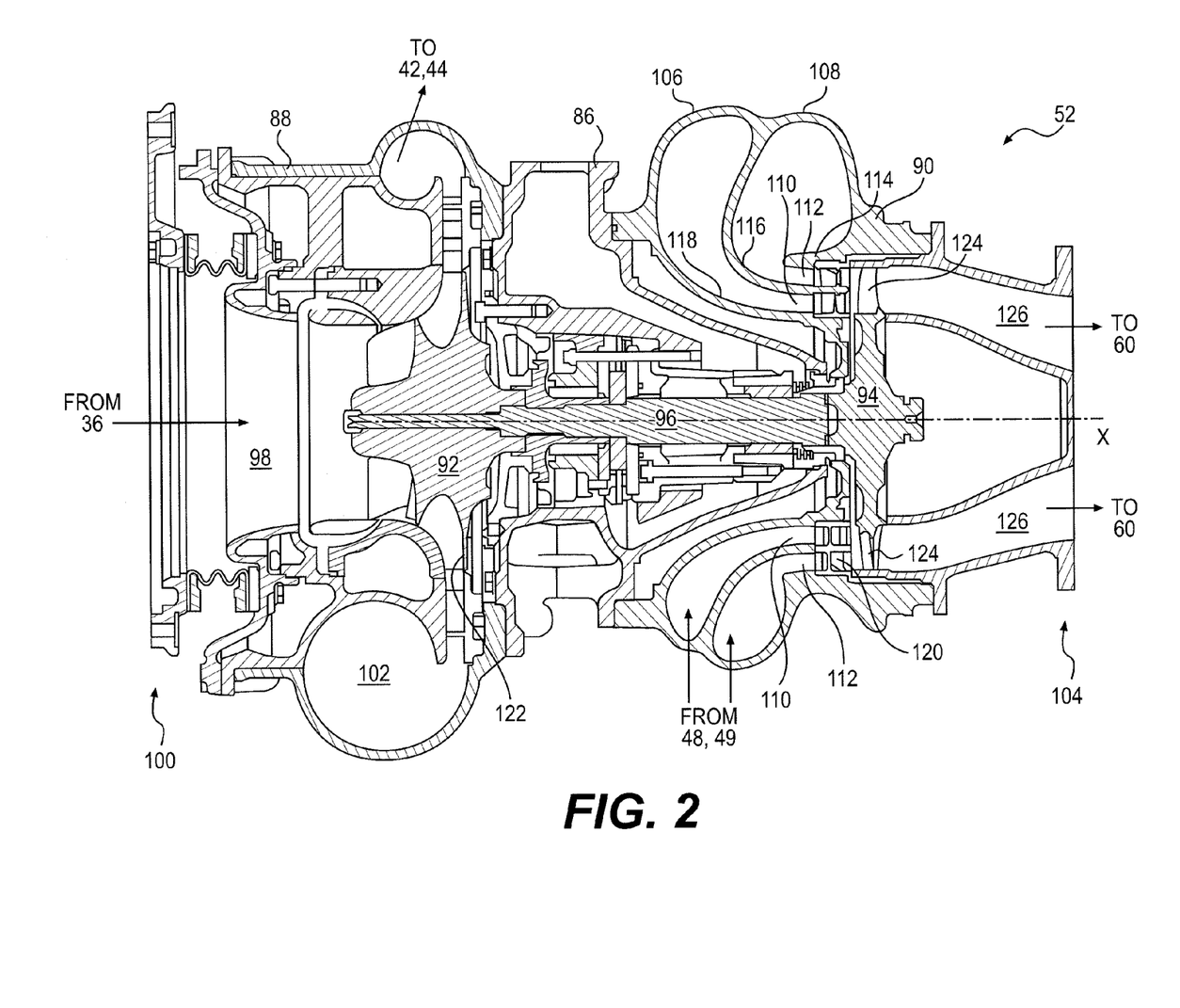
FIG. 2 is a cross-sectional illustration of a turbocharger that may be used in conjunction with the engine system of FIG. 1.

FIG. 2 illustrates a particular physical embodiment of a turbocharger having compressor 32 and turbine 52 connected to each other via a common shaft 96. The turbocharger may include a center housing 86 at least partially defining compressor and turbine shrouds 88, 90 that are configured to house corresponding compressor and turbine wheels 92, 94. Compressor shroud 88 may include an axially-oriented inlet 98 located at a first axial end 100 of the turbocharger, and a tangentially-oriented outlet 102 located between first axial end 100 and a second axial end 104 of the turbocharger. Turbine shroud 90 may include first and second volutes 106, 108 located between outlet 102 and second axial end 104 of the turbocharger. Turbine shroud 90 may be configured to receive exhaust flow from second and third exhaust manifolds 48, 49 in a tangential direction at first and second volute inlets (not shown). First and second volutes 106, 108 may each direct their separate exhaust flows in three directions: tangentially (around a rotation axis X), radially (along a radius of the corresponding volute), and axially (along rotation axis X) toward and through first and second axial channels 110, 112, respectively. Second axial channel 112 may be disposed between an annular tongue 114 and a coaxial inner wall 116 of first volute 106. First axial channel 110 may be located radially inward of second axial channel 112, and disposed between inner wall 116 of first volute 106 and a coaxial inner wall 118. A nozzle ring 120 may be disposed at ends of first and second axial channels 110, 112 and be configured to accelerate exhaust gas flowing therethrough.

As compressor wheel 92 is rotated, air may be drawn axially in to the turbocharger via inlet 98 and directed toward compressor wheel 92. Blades 122 of compressor wheel 92 may then push the air radially outward in a spiraling fashion and into intake manifolds 42, 44 (referring to FIG. 1) via outlet volute 102. Similarly, as exhaust from exhaust system 16 is directed tangentially, radially, and axially inward toward turbine wheel 94, the two different exhaust flows may push against blades 124 of turbine wheel 94, causing turbine wheel 94 to rotate and drive compressor wheel 92 via shaft 96. After passing through turbine wheel 94, the exhaust flows may combine and exit axially outward through a turbine outlet 126 located at second axial end 104 of the turbocharger into the atmosphere via passage 60 (shown only in FIG. 1). Compressor and turbine wheels 92, 94 may embody conventional wheels, with any number and configuration of blades 122, 124 radially disposed on corresponding wheel bases.

Although first and second volutes 106, 108 of turbine shroud 90 are shown in the exemplary embodiment of FIG. 2 as being generally symmetrical, it is contemplated that first and second volutes 106, 108 could alternatively be asymmetrical, if desired, for particular applications. For the purposes of this disclosure, asymmetry of first and second volutes 106, 108 may refer to a ratio of a temperature and pressure-normalized mass flow rate between the two volutes, as defined by the equation below:

$$\text{Asymmetry} = \frac{\phi_{Crit(SmallPassage)}}{\phi_{Crit(LargePassage)}} \times 100$$

wherein:

$$\phi = \frac{\dot{m}\sqrt{T}}{P}$$

$\phi_{Crit}$ = Critical Value $\dot{m}$ = Mass Flow Rate $T$ = Temperature $P$ = Pressure When first and second volutes 106, 108 are generally symmetrical, both volutes may support about the same flow rate of exhaust.

Figure 3:
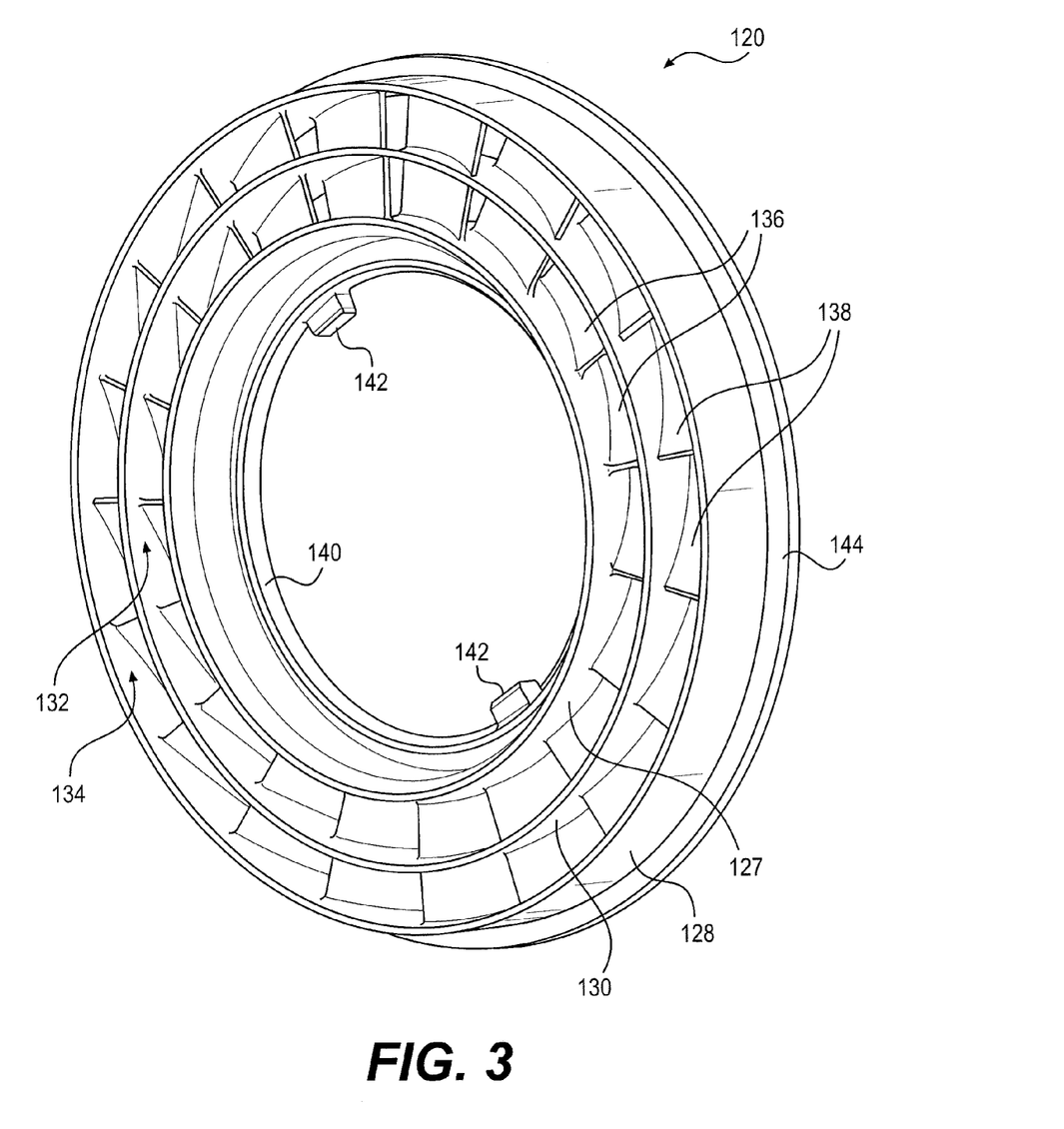
FIG. 3 is an isometric illustration of a nozzle ring that may be used in conjunction with the turbocharger of FIG. 2.

An exemplary embodiment of nozzle ring 120 is depicted in FIG. 3. As can be seen in this figure, nozzle ring 120 may include an inner annular band 127, an outer annular band 128, and an intermediate annular band 130 located at a desired location radially between inner and outer annular bands 127, 128. Inner and intermediate annular bands 127, 130 may be axially aligned and radially separated from each other so as to form an inner annular channel 132 that is configured to communicate with first axial channel 110 of first volute 106 (referring to FIG. 3). Similarly, Intermediate and outer annular bands 130, 128 may be axially aligned and radially separated from each other so as to form an outer annular channel 134 that is configured to communicate with second axial channel 112 of second volute 108. A first plurality of vanes 136 may be arranged within inner annular channel 132, while a second plurality of vanes 138 may be arranged within outer annular channel 134. Although shown as the same in number and angular configuration, it is contemplated that the number and/or aerodynamic design and configuration of the first plurality of vanes 136 may be different than the number and/or aerodynamic design and configuration of the second plurality of vanes 138, if desired.

A hub 140, having one or more radially inwardly protruding tabs 142 may be connected at an inner periphery of inner annular band 127 and used to connect nozzle ring 120 to turbine shroud 90. Similarly, a flange 144 that extends radially outward from outer annular band 128 may be used to axially position nozzle ring 120 within turbine shroud 90.

Although first and second channels 132, 134 of nozzle ring 120 are depicted in FIG. 3 as being intended for use with generally symmetrical volutes 106, 108 (i.e., although first and second channels 132, 134 are about the same size and have similar vane configurations), it is contemplated that first and second channels 132, 134 could alternatively be asymmetrical to support exhaust flows from corresponding asymmetrical volutes, if desired. For example, the channel associated with a smaller volute could have a reduced flow area and/or fewer vanes, as compared to the channel associated with a larger volute.

Figure 4:
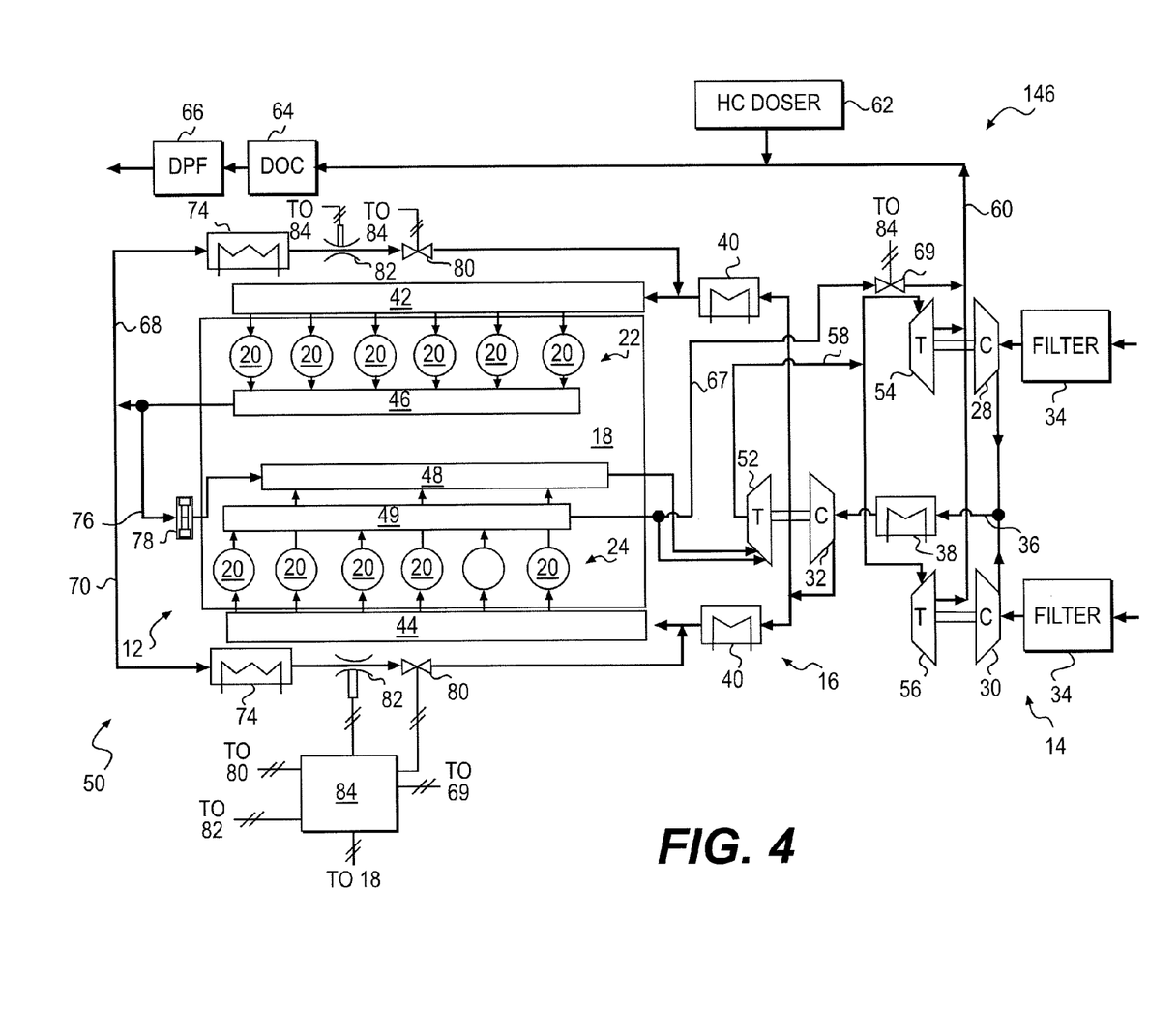
FIG. 4 is a schematic illustration of an alternative engine system.

An alternative engine system 146 is shown in FIG. 4, which is substantially similar to engine system 10 of FIG. 1. In this arrangement, however, turbine 52 is asymmetrical. In order to support this asymmetrical turbine 52, the layout of passages associated with engine system 146 have been modified, as compared to engine system 10. For example, balancing passage 76, in the configuration of FIG. 4, extends to only second exhaust manifold 48, which corresponds to the innermost or hub-side volute of turbine 52. In addition, bypass passage is connected to only third exhaust manifold 49, which corresponds to the outermost or shroud-side volute of turbine 52. This alternative engine system layout of passages shown in FIG. 4 may result in further improvement in exhaust gas recirculation control and turbine performance under pulsating flow conditions.

INDUSTRIAL APPLICABILITY

The disclosed engine system may be used in many different applications where engine performance, economy, emissions, and durability are important. Engine performance and economy may be improved through the use of a dual-volute turbocharger that preserves energy associated with exhaust pulses of different groups of co-firing cylinders. Emissions may be improved through the use of a unique exhaust gas recirculation configuration. The use of donor cylinders (e.g., first bank 22 of cylinders 20) for exhaust gas recirculation may further enhance performance, as changing demands for recirculated gas may not be able to cause instabilities or fluxes in turbocharge performance. Finally, uniform and well-guided axial flows of exhaust through the disclosed nozzle ring may result in overall lower aerodynamic losses and improved turbocharger durability.

It will be apparent to those skilled in the art that various modifications and variations can be made to the disclosed engine system. Other embodiments will be apparent to those skilled in the art from consideration of the specification and practice of the disclosed engine system. It is intended that the specification and examples be considered as exemplary only, with a true scope being indicated by the following claims and their equivalents.

What is claimed is:

1. A turbocharger for an engine, comprising:
a housing at least partially defining a compressor shroud and a turbine shroud, the turbine shroud forming a first volute and a second volute each having:
   a volute inlet configured to receive exhaust from an exhaust manifold of the engine in a tangential direction; and
   an axial channel disposed downstream of the volute inlet;
   the first volute having an inner annular wall and an annular tongue disposed coaxially outward off the inner annular wall, wherein the axial channel of the first volute is formed between the inner annular wall and the annular tongue; and
   the second volute further has an inner annular wall, wherein the axial channel of the second volute is formed between the inner annular wall of the second volute and the inner annular wall of the first volute;
a turbine wheel disposed within the turbine shroud and configured to receive exhaust from the axial channels of the first and second volutes;
a compressor wheel disposed within the compressor shroud;
a shaft connecting the turbine wheel to the compressor wheel; and
a nozzle ring in fluid communication with the axial channels of the first and second volutes at a location upstream of the turbine wheel;
wherein the turbine wheel further includes:
   an annular hub; and
   a plurality of blades extending outward from the annular hub in fluid communication with the nozzle ring at the axial channels of the first and the second volutes; and
wherein the nozzle ring includes:
   an inner annular band;
   an outer annular band;
   an intermediate annular band located radially between the inner and outer annular bands;
   a first plurality of vanes extending between the inner and intermediate annular bands and associated with only the first volute; and
   a second plurality of vanes extending between the intermediate and the outer annular bands and associated with only the second volute.

2. The turbocharger of claim 1, wherein:
the compressor shroud further includes a compressor inlet located at a first axial end of the turbocharger;
the turbine shroud further includes an outlet located at a second axial end of the turbocharger; and
the volute inlets of the first and second volutes are located between the first and second axial ends of the turbocharger.

3. The turbocharger of claim 2, wherein the compressor shroud further includes an outlet volute located between the compressor inlet of the compressor shroud and the volute inlets of the first and second volutes.

4. The turbocharger of claim 1, wherein the nozzle ring includes a number of the first plurality of vanes that is different than a number of the second plurality of vanes.

5. The turbocharger of claim 1, wherein the nozzle ring includes an aerodynamic design and configuration of the first plurality of vanes is different than an aerodynamic design and configuration of the second plurality of vanes.

6. An engine system, comprising:
an engine block at least partially defining a plurality of cylinders;
an axial flow turbocharger having first and second volutes;
a first exhaust manifold associated with a first grouping of the plurality of cylinders, the first grouping of the plurality of cylinder including all cylinders within a first bank of the plurality of cylinders;
an exhaust gas recirculation passage extending from the first exhaust manifold to all of the plurality of cylinders;
a second exhaust manifold extending from a second grouping of the plurality of cylinders to the first volute of the axial flow turbocharger; and
a third exhaust manifold extending from a third grouping of the plurality of cylinders to the second volute of the axial flow turbocharger, the second and third groupings each including different cylinders from a second bank of the plurality of cylinders.

7. The engine system of claim 6, further including:
a balancing passage extending from the first exhaust manifold to the second and/or third exhaust manifolds; and
a balancing valve disposed within the balancing passage.

8. The engine system of claim 6, further including:
a bypass passage extending from the first and/or second exhaust manifolds around the axial flow turbocharger; and
a bypass control valve disposed within the bypass passage.

9. The engine system of claim 6, further including at least one single-volute axial-flow turbocharger located downstream of the axial flow turbocharger.

10. The engine system of claim 9, wherein the at least single-volute axial flow turbocharger includes two single-volute axial-flow turbochargers disposed in parallel with each other.

11. The engine system of claim 6, further including two control valves configured to regulate exhaust flow through the first exhaust manifold, each of the two control valves being independently controllable and associated with one of the first and second banks of the plurality of cylinders.

12. The engine system of claim 11, further including two coolers, each being located upstream of one of the two control valves.

13. The engine system of claim 6, wherein the axial flow turbocharger includes a common nozzle ring associated with the first and second volutes.

* * * * *